(12) United States Patent
Marakov et al.

(10) Patent No.: US 9,227,849 B2
(45) Date of Patent: Jan. 5, 2016

(54) SYSTEMS AND METHODS FOR PROCESSING SYLVINITE AND CARNALLITE ORES

(75) Inventors: Valery Marakov, Berezniki (RU); Alexey Zarubin, Noyabrsk (RU)

(73) Assignee: BIO TECHNO TERRA, LLC

( * ) Notice: Subject to any disclaimer, the term of this patent is extended or adjusted under 35 U.S.C. 154(b) by 708 days.

(21) Appl. No.: 13/556,898

(22) Filed: Jul. 24, 2012

(65) Prior Publication Data
US 2014/0030164 A1    Jan. 30, 2014

(51) Int. Cl.
B01D 9/00 (2006.01)
C01D 3/08 (2006.01)
C01F 5/30 (2006.01)

(52) U.S. Cl.
CPC ... *C01D 3/08* (2013.01); *C01F 5/30* (2013.01); *B01D 9/0013* (2013.01)

(58) Field of Classification Search
CPC .............. C01D 3/04; C01D 3/06; C01D 3/08; C01D 3/14; C01F 5/00; C01F 5/30; B01D 9/00; B01D 9/0013
USPC ............ 422/129, 186, 186.04, 224, 225, 232, 422/243, 245.1, 255, 261, 269–271, 278, 422/292, 600, 605–608, 618, 624, 650
See application file for complete search history.

(56) References Cited

U.S. PATENT DOCUMENTS

| | | |
|---|---|---|
| 2,715,608 A | 8/1955 | Casciani et al. |
| 2,762,505 A | 9/1956 | Lawyer |
| 2,782,923 A | 2/1957 | Cook, Jr et al. |
| 2,788,257 A | 4/1957 | Duke |
| 2,805,769 A | 9/1957 | Lawver |
| 2,805,770 A | 9/1957 | Lawver |
| 2,839,190 A | 6/1958 | Lawver |
| 2,927,010 A | 3/1960 | Le Baron |
| 2,968,525 A | 1/1961 | Clark et al. |
| 3,008,573 A | 11/1961 | Gross et al. |
| 3,073,447 A | 1/1963 | Autenrieth et al. |
| 3,096,034 A | 7/1963 | Schmidlapp |
| 3,217,876 A | 11/1965 | Autenrieth |
| 3,225,924 A | 12/1965 | Autenrieth et al. |
| 3,388,794 A | 6/1968 | Peuschel |
| 3,458,039 A | 7/1969 | Singewald |

(Continued)

FOREIGN PATENT DOCUMENTS

| | | |
|---|---|---|
| RU | 2307790 C1 | 10/2007 |
| RU | 2369558 C2 * | 10/2009 |

OTHER PUBLICATIONS

RU 2369558 C2 with translation.*

*Primary Examiner* — Kenneth A Bratland, Jr.

(57) ABSTRACT

Disclosed are systems and methods for processing carnallite or sylvinite ores. The system includes a measuring hopper, a lye clarifier, two vertical ore dissolving apparatuses, two ore dehydrators and one wet product dehydrator, a crystallizer, and a dryer. Each dissolving apparatus has alternating supply and grounding electrodes arranged in axial alignment with the apparatus. The ore is run through both dissolving apparatuses in succession and dehydrated after each dissolving apparatus. A dissolving lye is fed to each dissolving apparatus in countercurrent flow to the solid phase ore. The saturated lye from the dissolving apparatuses is transported to a crystallizer to be cooled. Cooling the lye forms crystalline potassium chloride or artificial carnallite, which then goes for dehydration and drying.

15 Claims, 4 Drawing Sheets

(56) References Cited

U.S. PATENT DOCUMENTS

| | | | |
|---|---|---|---|
| 3,477,566 A | 11/1969 | Autenrieth et al. | |
| 3,829,559 A * | 8/1974 | Dancy | C01F 5/30 299/5 |
| 4,056,599 A | 11/1977 | Fox, III et al. | |
| 4,071,276 A | 1/1978 | Cecil | |
| 4,272,341 A * | 6/1981 | Lamb | C22B 13/04 205/603 |
| 4,272,343 A | 6/1981 | Brunsell et al. | |
| 6,464,736 B1 * | 10/2002 | Hazen | B01D 9/005 23/295 R |
| 6,709,472 B1 | 3/2004 | Ferretti | |
| 6,776,972 B2 | 8/2004 | Vohra et al. | |
| 2009/0057204 A1 | 3/2009 | Bennington, II et al. | |
| 2012/0167818 A1 | 7/2012 | Blum et al. | |

\* cited by examiner

SYSTEMS AND METHODS FOR PROCESSING SYLVINITE AND CARNALLITE ORES

TECHNICAL FIELD

This disclosure relates to systems and method for processing sylvinite and carnallite ores. More specifically, the disclosure relates to processing sylvinite ore into potassium chloride and processing carnallite ore into artificial carnallite.

BACKGROUND OF THE INVENTION

Sylvinite ore is a mechanical mixture of sylvite (potassium chloride or "KCl") and halite (sodium chloride or "NaCl"). Common sylvinite ores have about 31% KCl and 66% NaCl with the balance being extraneous materials, such as insoluble clays, anhydrite, and carnallite. Sylvinite ore is mined throughout North America. Sylvinite ore must be processed to remove the extraneous materials and separate the potassium chloride from the sodium chloride. The potassium chloride can thereafter be used in the production of potash and fertilizer.

There are various processes for separating potassium chloride from sylvinite. One of these is the flotation method. The flotation method involves the sorption of potassium chloride salts on a surfactant and the producing potassium chloride from solution. The flotation method, however, suffers from the drawback that only a very low degree of potassium chloride can be recovered from the sylvinite ore. Recovery of potassium chloride (KCl) from the ore is approximately 85%, and flotation tails, which goes to the waste takes 2.5-3% of potassium chloride.

Another method is the halurgic method. The halurgic method is based on the varying solubility of potassium chloride (KCl) and sodium chloride (NaCl) in water at different temperatures. KCl crystallizes out of a saturated solution upon cooling. The disadvantages of this method are the high energy costs involved and the low degree of potassium chloride recovery from the ore. Recovery of potassium chloride (KCl) from the ore is approximately 87.5%, and tails, which goes to the waste, takes 2.5-3% of potassium chloride.

Yet another method is disclosed in U.S. Pat. No. 2,762,505 to Lawyer. Lawyer illustrates an electrodynamic method for beneficiating sylvinite ore. The method recovers potassium chloride from potash-bearing ores. In one embodiment, dual electrostatic fields are used. Nonionizing fields with voltages varying between 1,000 to 5,000 volts or between 5,000 to 15,000 volts are disclosed.

RU 2,307,79 to Marakov et al. discloses a potassium chloride and sodium chloride production apparatus. Ground sylvinite ore is dissolved in recycled potassium chloride-saturated lye. The resulting solution is exposed to low-frequency (1-5 Hz) alternating electric fields at voltage source 30-100 v. A two column treatment method is also disclosed.

U.S. Pat. No. 3,073,447 to Autenrieth et al. discloses a system for electrostatic separation of potassium-containing materials. A conditioning agent is used prior to an electrostatic separator. Furthermore, U.S. Pat. No. 3,477,566 to Autenrieth et al. discloses a process for the electrostatic separation of the sylvite (KCl) component of a mineral. The process conditions particulate crude salt with inorganic mineral acids, inorganic alkaline reacting substances, and organic conditioning agents prior to electrostatic charging.

The background art also contains several examples of methods for processing carnallite ores. Like sylvinite ores, carnallite ores are a source of potash and fertilizer. Carnallite's chemical formula is $KMgCl_3.6(H_2O)$. Naturally occurring carnallite is hard to find and typically occurs only in evaporating seas or sedimentary basins. For this reason, various efforts have been made over the years to produce artificial or synthetic carnallite. The background art contains various examples of producing synthetic carnallite from the crystallization of KCl and $MgCl_2.6H_2O$.

Artificial carnallite may be produced via known methods, such as the flotation and halurgic methods discussed above can also be used in the production of artificial carnallite. But again, these methods suffer from numerous disadvantages, including the low degree of the effective product recovery and the need for cumbersome technical procedures for ore processing.

Thus, there are inherent disadvantages found in the background art. These disadvantages include complexity of implementation due to the need for special equipment and the need for large production areas. There are also high energy and material costs associated with the background art. The systems of the background art also produce a low quality end product. The present disclosure is aimed at overcoming these and other shortcomings found in the background art.

SUMMARY OF THE INVENTION

It is an object of the present disclosure to provide a sylvinite processing facility and may be used in potassium and other mining and chemical enterprises.

The present disclosure provides an advantage by creating a vertical facility for processing sylvinite ore that makes it possible to use non-waste technologies, ensure the most complete utilization of feedstocks, and increase the production and purity of the end products.

A further advantage is realized in the present disclosure by reducing energy costs, increasing economic efficiency, and ensuring the environmental friendliness of the overall process.

Another advantage is accomplished in the present disclosure by reducing material costs and simplifying the design of the process by eliminating rotating components and increasing service life of the system (facility unites).

The present disclosure also enhances the quality of the end product due to the reduction in moisture content and the reduction of energy costs at all stages of production.

Yet another advantage of the disclosed system is realized by employing a closed loop operating principle with repeated usage of a circulating lye.

Still yet another objective of this disclosure is achieved by allowing a high degree of potassium chloride recovery from sylvinite ore with minimal energy costs.

A further advantage is realized in the reduction of material costs due to the elimination from the process of lye heating and cooling stages and hot-water washing of the clay extract.

The present disclosure also realizes an advantage by increasing the production and purity of artificial carnallite while at the same time reducing energy and material costs.

An additional advantage is achieved by utilizing a vertical contacting apparatus for processing carnallite ore that makes it possible to use non-waste technologies, ensure the most complete utilization of the feedstock, increase the production and purity of the end products with low energy costs, and increase the economic efficiency and environmental friendliness of the process.

Further advantages are realized in the production of artificial carnallite by reducing material costs, simplifying of the system design, increasing the service life of the design, and increasing the quality of the end product by reducing the moisture content, and reducing the energy costs at all production stages.

Yet another advantage of the disclosure is achieved by providing a high degree of artificial carnallite recovery from potassium-magnesium ores with minimal energy costs.

Still yet another advantage is accomplished by producing artificial carnallite while realizing a reduction in material costs via the elimination of lye heating and cooling stages and hot-water washing of the clay slurry.

These and other advantages are achieved via a system and method processing carnallite or sylvinite feedstock. The system includes a measuring hopper, a lye clarifier, two vertical ore dissolving apparatus, two screw-type ore dehydrators and one screw-type wet product dehydrator, a crystallizer, and a dryer. Each dissolving apparatus has alternating supply and grounding electrodes arranged in axial alignment with the apparatus. The ore is run through both dissolving apparatus in succession and dehydrated after each dissolving apparatus. A dissolving lye is fed to each dissolving apparatus in countercurrent flow to the solid phase ore, goes over the apparatus spillovers, and arrives together with the lye from the dehydrators at the crystallizer, which consists of a shell-and-tube heat exchanger. The dissolution of the ore in the apparatus takes place simultaneously with the application of a low-frequency alternating electromagnetic field to the suspension. The solid phase from the second dissolving apparatus is removed to waste after dehydration. When the lye is cooled in the crystallizer, it forms crystalline potassium chloride or artificial carnallite, which then goes for dehydration and drying. The circulating lye goes to the pulverized dissolving stage after the potassium chloride or carnallite crystals have been separated out through clarification.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar components throughout the several views of the drawings.

DETAILED DESCRIPTION OF THE PREFERRED EMBODIMENTS

The present disclosure relates to systems and methods for processing carnallite or sylvinite ores. The system includes a measuring hopper, a lye clarifier, two vertical ore dissolving apparatuses, two ore dehydrators and one wet product dehydrator, a crystallizer, and a dryer. Each dissolving apparatus has alternating supply and grounding electrodes arranged in axial alignment with the apparatus. The ore is run through both dissolving apparatuses in succession and dehydrated after each dissolving apparatus. A dissolving lye is fed to each dissolving apparatus in countercurrent flow to the solid phase ore. The saturated lye from the dissolving apparatuses is transported to a crystallizer to be cooled. Cooling the lye forms crystalline potassium chloride or artificial carnallite, which then goes for dehydration and drying.

System for Producing Potassium Chloride

Figure 1:
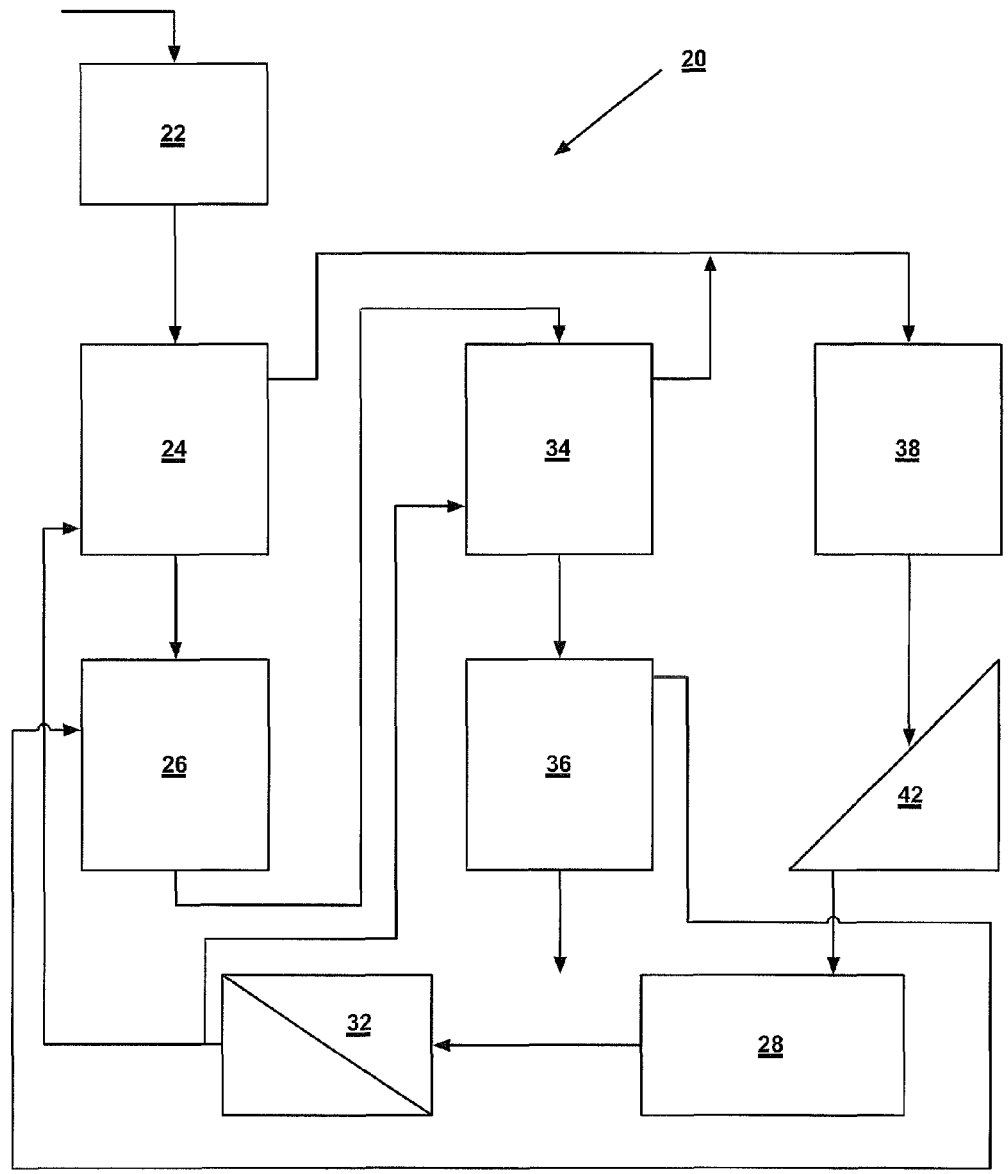
FIG. 1 is a diagram illustrating a first embodiment of a system for processing sylvinite ore.

FIG. 1 is a diagrammatic illustration of a system 20 for processing sylvinite ore to produce potassium chloride. As illustrated, system 20 includes a measuring hopper 22 for metering a volume of ore to be processed. Hopper 22 can employ either a weight based or volumetric based metering. Hopper 22 generally includes and inlet for initially receiving the ore and an outlet for dispensing the ore once metered. The ore may be crushed prior to being received within hopper 22.

From hopper 22, the metered ore is delivered to a first dissolving apparatus 24. First dissolving apparatus 24 includes upper and lower inlets and upper and lower outlets. Hopper 22 delivers the ore into the upper inlet. First dissolving apparatus 24, in turn, is in communication with a first dehydrator 26. First dehydrator 26 includes an upper inlet and a lower outlet. The upper inlet of dehydrator 26 is in communication with the lower outlet of the first dissolving apparatus 24.

A lye solution is delivered to the interior of the first dissolving apparatus 24 via the lower port. Prior to the lye solution being delivered to apparatus 24, the lye is clarified in a lye clarifier 28 and heated in lye a heater 32. The clarifier 28 and heater 32 are arranged in the direction of the flow of the lye. The heated and clarified lye solution is thereafter supplied to the lower inlet of the first dissolving apparatus 24. Within the interior of dissolving apparatus 24 the lye solution and sylvinite ore are brought into counter current flow. More specifically, the lye solution is fed upwardly within apparatus 24 as the sylvinite ore travels downwardly. This countercurrent flow facilitates the leaching of potassium chloride from the sylvinite ore by the heated lye. As a result of the leaching, the lye becomes a supersaturated potassium chloride solution. A portion of the sylvinite is dissolved during this process and a portion remains undissolved. The undissolved portion exits apparatus 24 via the lower outlet and travels to the inlet of the first dehydrator 26.

System 20 employs both a first and a second dissolving apparatuses or columns (24 and 34, respectively). Apparatuses 24 and 34 preferably share the same construction. Second dissolving apparatus 34 includes upper and lower inlets and upper and lower outlets. The upper inlet of the second dissolving apparatus 34 receives the undissolved sylvinite ore from the lower outlet of the first dehydrator 26. Any remaining potassium chloride is removed from the undissolved sylvinite via the second dissolving apparatus 34. The lower inlet of the second dissolving apparatus 34 receives the heated and clarified lye solution via lye clarifier 28 and the lye heater 32. As with the first dissolving apparatus 24, the heated lye solution and undissolved sylvinite ore are brought into counter current flow within the second dissolving apparatus 34. This interaction produces an additional volume of a supersaturated potassium chloride solution and further dissolves the undissolved sylvinite ore.

A second dehydrator 36 is associated with the second dissolving apparatus 34. The second dehydrator 36 includes an inlet and an outlet. The inlet of the second dehydrator 36 is in communication with the lower outlet of the second dissolving apparatus 34. Second dehydrator 36 receives any remaining undissolved sylvinite ore from the second dissolving apparatus 34. This undissolved sylvinite ore can be disposed of following dehydration. A portion of the ore from second dehydrator 36 can be optionally routed to the first dehydrator 26 to be reused within apparatus 34.

A crystallizer 38 is used in crystallizing the potassium chloride from the supersaturated lye solution. Crystallizer 38 includes an inlet and an outlet. More specifically, the upper outlets of apparatuses 24 and 34 can be spillovers that allow the supersaturated potassium chloride solution to exit apparatuses 24 and 34. Thereafter, the supersaturated potassium chloride solution is delivered to the inlet of crystallizer 38. Crystallizer 38 is preferably a heat exchanger that cools the supersaturated potassium chloride solution. This cooling forms a crystallized potassium chloride. A third dehydrator 42, which can be a wet product dehydrator, thereafter dehydrates the crystallized potassium chloride. The crystallized potassium chloride after drying can then be utilized for any of a number of intended purposes.

Second Embodiment of the System for Producing Potassium Chloride

Figure 2:
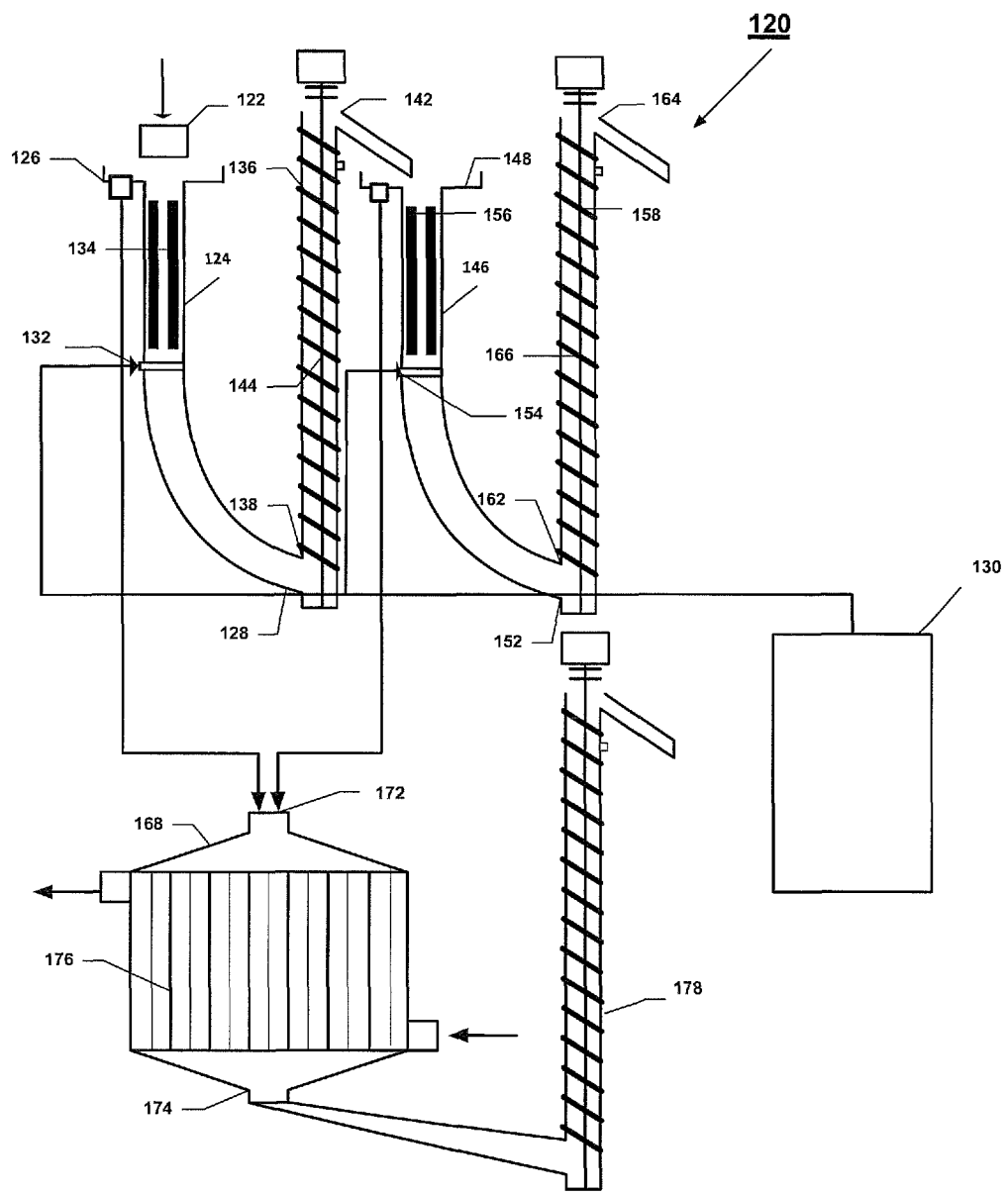
FIG. 2 is diagram illustrating a second embodiment of a system for processing sylvinite ore.

A second embodiment of the system is illustrated in FIG. 2. System 120 utilizes measuring hopper 122 for receiving a supply of pulverized sylvinite ore for processing. A first dissolving apparatus 124 is also included. Dissolving apparatus 124 has upper and lower ends, an intermediate extent therebetween, and an interior area. Dissolving apparatus 124 is in the form of a column. The cross section of the column determines the flow rate of the ore to be processed. Dissolving apparatus 124 further includes a spillway 126 at the upper end, an outlet 128 at the lower end, and a port 132 along the intermediate extent. Alternating supply and grounding electrodes 134 are positioned within the interior area of apparatus 124. Supply electrodes are connected to a source of power of alternating current with a variable frequency of 1 between 1 to 3 Hertz ("Hz"), a supply voltage of approximately 24-30 volts ("V"), and a ramp period of 1-3 seconds. The electrodes preferably have a spacing of 0.04 meters and a length of 1.5 meters. Electrodes 134 are aligned with the flow of both the ore and the lye solutions. They are also in axial alignment with apparatus 124.

A volume of solvent lye is supplied from source 130 to the interior area of apparatus 124 via port 132. The solvent lye is preferably supplied at a temperature of approximately 40-50° C. Sylvinite ore supplied to the upper end of apparatus 124 from measuring hopper 122. The solvent lye mixes with the sylvinite ore in a counter current flow within the interior area of apparatus 124. Dissolving of the ore in the apparatus 124 occurs conjointly with the suspension treatment by alternating electromagnetic field of low frequency that is applied on the supply electrodes 134. Under the alternating electromagnet field treatment the supersaturated potassium chloride solution is produced.

A first dehydrator 136 is associated with first dissolving apparatus 124. Dehydrator 136 includes a lower inlet 138 and an upper outlet 142. An internal screw conveyor 144 extends between the lower inlet 138 and the upper outlet 142. Internal conveyor 144 is driven by an upper geared motor. Undissolved sylvinite ore exiting the outlet 128 of the first dissolving apparatus 124 enters the lower inlet 138 of first dehydrator 136. Internal screw conveyor 144 transports the undissolved sylvinite ore to the upper outlet 142 of dehydrator 136. As it is conveyed, moisture is removed from the sylvinite ore.

System 120 also includes a second dissolving apparatus 146. Second dissolving apparatus 146 has an identical to the first dissolving apparatus 124. Second dissolving apparatus 146 has upper and lower ends, an intermediate extent therebetween, and an interior area. Apparatus 146 has a spillway 148 at the upper end, an outlet 152 is at the lower end, and a port 154 along the intermediate extent. Alternating supply and grounding electrodes 156 are positioned within the interior area of apparatus 146. Electrodes 156 have the same construction and operation as electrodes 134. At any point in the treatment time, the application of the fields on supply electrodes 156 occurs in phase opposition with electrodes 134. This phase opposition of the fields results in a reduction in the power consumption per unit of solution volume being treated. A volume of solvent lye is supplied to the interior area of apparatus 146 via port 154. Sylvinite ore is supplied to the upper end of the second dissolving apparatus 146 via the upper outlet 142 of the first dehydrator 136. The solvent lye mixes with the sylvinite ore in a counter current flow and within an alternating electromagnetic field applied on the supply electrodes 156. This process produces a supersaturated potassium chloride solution and undissolved sylvinite ore.

A second dehydrator 158 is associated with second dissolving apparatus 146. The construction of second dehydrator 158 is the same as first dehydrator 136. This second dehydrator 158 includes a lower inlet 162 and an upper outlet 164. An internal screw conveyor 166 extends between the lower inlet and the upper outlet. Screw conveyor 166 is powered by an upper geared motor. Undissolved sylvinite ore exiting the outlet 152 of the second dissolving apparatus 146 enters the lower inlet 162 of the second dehydrator 158. Undissolved ore from the second dehydrator 158 can be used to produce food-grade or industrial-grade salt. Alternatively, the undissolved ore can be disposed. Internal screw conveyor 166 transports the undissolved sylvinite ore to the upper outlet 164.

System 120 also includes a crystallizer 168. Crystallizer 168 includes an upper inlet 172, a lower outlet 174, and an interior area 176. Interior area 176 has a heat exchanger. In the preferred embodiment, the heat exchanger is a shell in tube type heat exchanger wherein the supersaturated potassium chloride solution is brought into thermodynamic contact with a refrigerant. Supersaturated potassium chloride is received in the upper inlet 172 from the spillways (126 and 148) of the first and second dissolving apparatuses (124 and 146). The supersaturated potassium chloride is crystallized via the heat exchanger to form crystallized potassium chloride. Any non crystallized solution (i.e. the remaining lye solution after the crystals have been taken out) is clarified and heated and re-circulated for use within dissolving apparatuses 124 and 146. A third dehydrator 178 is in communication with the lower outlet 174 of crystallizer 168. Third dehydrator 178 dries the crystallized potassium chloride formed in the crystallizer. The crystallized potassium chloride can then be utilized for any of a number of intended purposes.

In use, sylvinite ore is employed that contains more than 70% of crystalline sodium chloride by weight, approximately 30% of impurities by weight. The impurities include approximately 26.5% of potassium chloride by weight. The remainder of the ore includes insoluble residues with other salts. The ore is crushed to a grain size of <5 mm and fed to measuring hopper 122. Saturated lye is prepared in a clarifier (not shown in FIG. 2). The crushed ore is fed to the first dissolving apparatus 124, and dissolving lye in a liquid/solid ratio of 2:1 is supplied from the lower inlet of apparatus 124. The lye preferably has a temperature of approximately 40-50° C. The lye is supplied in countercurrent flow to the ore. This helps partially dissolve the ore within apparatus 124. In a preferred, but non-limiting example, vertical dissolving apparatus 124 has a height of approximately 1.5 m. Dissolving of the ore occurs with the conjointly suspension treatment with alternating electromagnetic field applied on electrodes 134. In the preferred embodiment, the electromagnetic field has a variable frequency of approximately 1 to 3 Hertz (Hz) and a supply voltage of approximately 24 to 30 volts (V). A similar process is carried out in the second dissolving apparatus 146. As a result, the potassium chloride is converted from ore to a solution, and supersaturated potassium chloride solutions are formed.

The supersaturated potassium chloride solutions go over the spillovers and into crystallizer 168. As a result of the crystallizer 168, cooling of the supersaturated solution is achieved. In the preferred embodiment, the solution is cooled to a temperature of approximately 25° C. At this temperature, the potassium chloride is crystallized and is no longer in solution. The crystallized potassium chloride then goes from crystallizer 168 to the wet product dehydrator 178 for drying.

In the proposed facility 120, ore goes from apparatus 124 through dehydrator 136 and apparatus 146. After dissolution and low-frequency electromagnetic field treatment of the suspension, an ore is produced with a residual potassium chloride content of less than 1%. The waste ore goes through the second dehydrator 158 and is ultimately disposed. The lye from the crystallizer 168 goes for clarification. After settling, the insoluble residue is removed from the process in the form of fine clay, which can be used in the chemical and construction industries or for economic purposes. The clarified lye is sent via a heater to be reused in the process.

After the crystallizer 168, the potassium chloride undergoes washing, during which the crystalline potassium chloride is run through a column of clarified dissolving lye. Washing separates the potassium chloride and the insoluble residue. After washing, the separated, pure crystalline potassium chloride goes through a dehydrator 178 for drying. Ultimately, the proposed facility makes it possible to produce high-quality potassium chloride in a closed cycle with a circulating lye, with a potassium chloride content of more than 99% in the end product.

Method for Producing Potassium Chloride

The method associated with systems 20 and 120 is described next. Crushed sylvinite ore with an average grain size of <5 mm, containing over 70% of sodium chloride by weight and 30% of impurities by weight, including 23.1% of potassium chloride by weight and the remainder being insoluble residue with other salts, underwent processing. The ore was processed in a sodium-chloride-saturated circulating lye with a 12.04% content of potassium chloride. The pulverized ore was fed through an ore feed section to the first vertical dissolving column with a height of 1.5 m. The lye was supplied in countercurrent flow to the ore at a temperature of 45° C. The lye was introduced in the lower part of the column.

Supply electrodes with a spacing of 0.04 m and height of 1.5 m were installed in axial alignment in the column and were connected to a source of AC voltage with a variable frequency of 1 Hz and voltage of 26 V. At the same time that the lye and ore were supplied, the suspension was treated with an electromagnetic field. The supersaturated potassium chloride lye overflowed from the column and was sent to a refrigerator. Upon cooling in the refrigerator, the potassium chloride crystallized in the lye and precipitated. The ore was removed from the lower part of the dissolving column and was sent for dehydration. Following dehydration, the ore was supplied via the top feed to the second vertical dissolving column, which is designed similarly to the first column. Lye at a temperature of 45° C. was supplied in the lower part of the column in countercurrent flow to the ore. The second stage of leaching of the solution and electromagnetic field with low frequency treatment was carried out in the second column.

The supersaturated potassium chloride lye went via a spillover in the top part of the column to the refrigerator, where the process of potassium chloride crystallization took place in the suspension due to the cooling. The potassium chloride content in the original lye, ore, and circulating lye was determined by the perchlorate method. Chemical analysis of the samples showed that, as a result of the first leaching stage, 70% of the potassium chloride from the ore passed into solution. After the second leaching stage, less than 1% of the potassium chloride remained in the ore. The potassium chloride content in the end product was over 99.3%. These results speak to the comparatively high degree of potassium chloride recovery from the ore and the high quality of the end product.

Thus, the method developed makes it possible to produce high-quality potassium chloride by treating a suspension with an alternating electromagnetic field and to have almost complete recovery of potassium chloride from the ore with minimal energy and material costs.

System for Producing Artificial Carnallite

Figure 3:
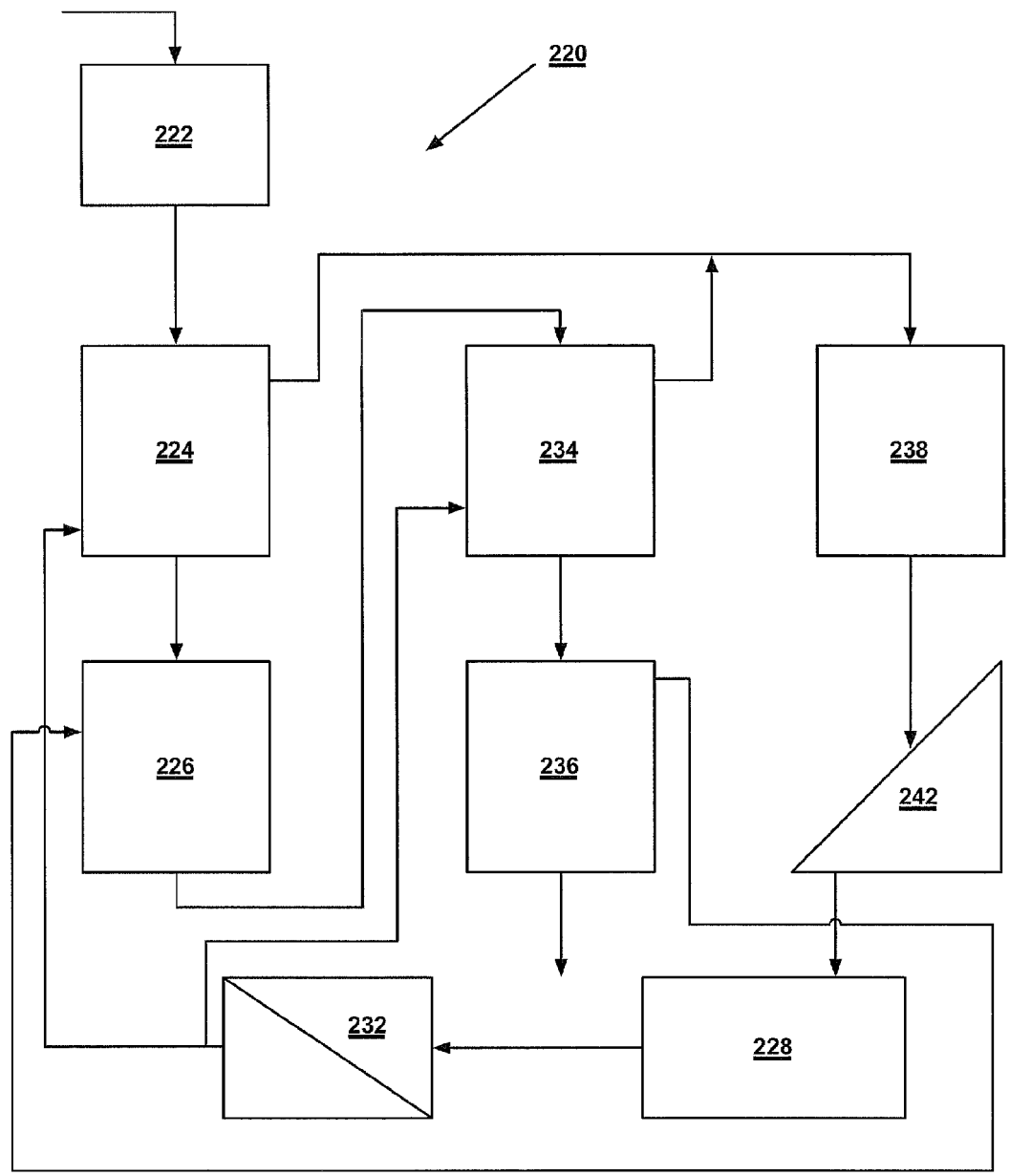
FIG. 3 is a diagram illustrating a first embodiment of a system for processing carnallite ore.

FIG. 3 shows a system 220 for processing carnallite ore. System 220 is similar in most respects to the system 120 for producing potassium chloride. However, the recirculating lye of system 220 is used to leach potassium chloride and magnesium chloride from carnallite ore. The potassium chloride and magnesium chloride are then crystallized to form artificial carnallite.

System 220 includes a measuring hopper 222, a lye clarifier 228, and a lye heater 232. Clarifier 228 and heater 232 are arranged in the direction of the flow of lye. Dissolving (or contacting) apparatuses 224 and 234 are connected to ore dehydrators 226 and 236. In FIG. 3, artificial carnallite crystallizer 238 is operatively connected to the end product dehydrator 242. Crushed carnallite ore is initially provided to measuring hopper 222. From hopper 222 the crushed ore to be dissolved is delivered to the first dissolving apparatus 224. Dissolving lye is also fed to apparatus 224 from the heater 232. The crushed ore and lye are supplied to apparatus 224 in a countercurrent flow. From the dissolving apparatus 224, the ore is delivered to the first dehydrator 226. Ore from dehydrator 226 then goes to the second dissolving apparatus 234. As with the first dissolving apparatus 224, dissolving lye is fed to second apparatus 234 in countercurrent flow to the ore. In dissolving apparatuses 224 and 234, a supersaturated solution of potassium chloride and magnesium chloride is formed. From the spillovers of the dissolving apparatuses 224 and 234, the supersaturated solution proceeds into the crystallizer 238. In crystallizer 238, artificial carnallite crystallizes from the solution in volume. Crystallizer 238 can be a refrigerator or heat exchanger. From the crystallizer 238, the wet product goes through the end (or wet) product dehydrator 242 for drying. The crystallized artificial carnallite can then be utilized for any of a number of intended purposes.

Second Embodiment of the System for Producing Artificial Carnallite

Figure 4:
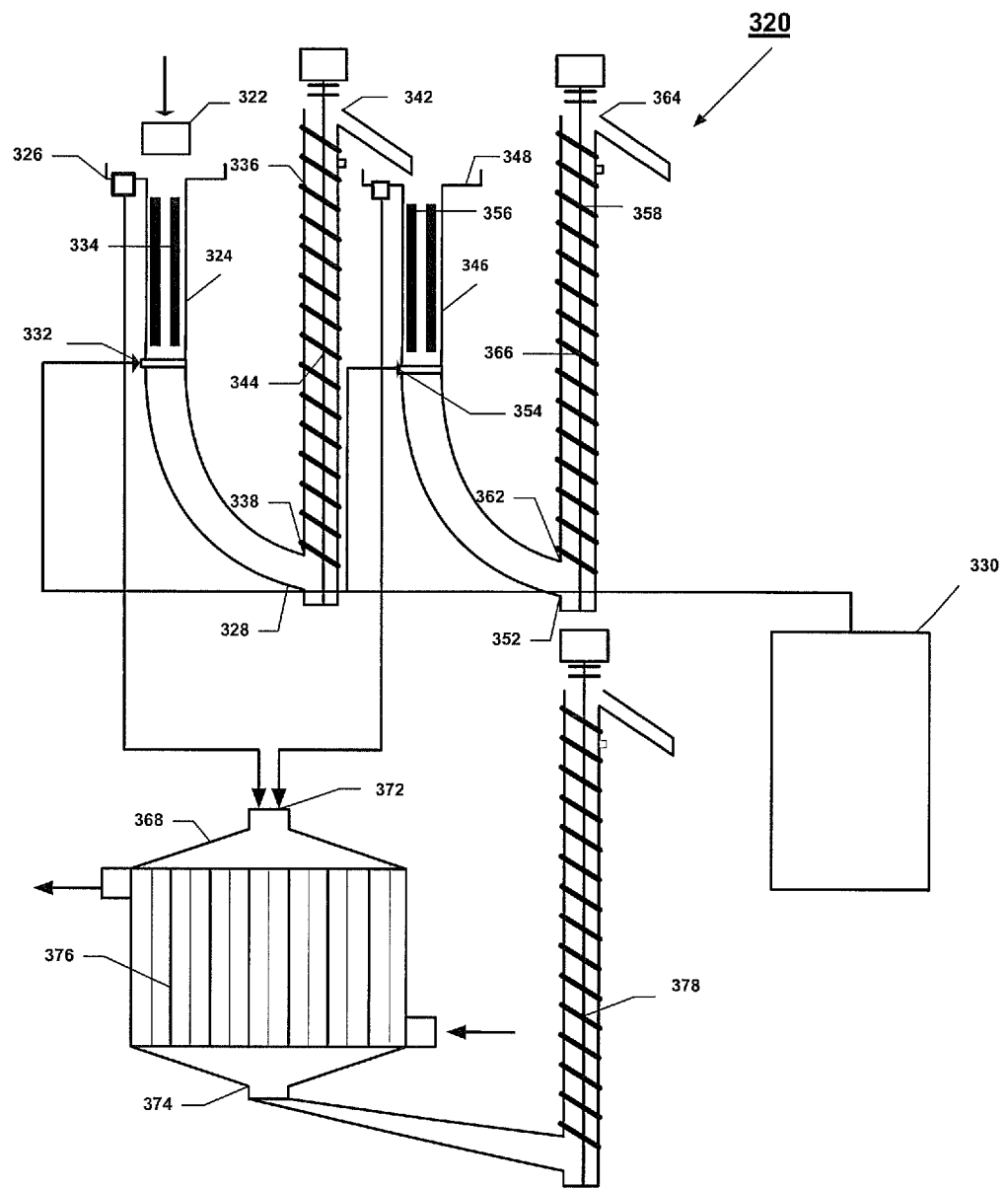
FIG. 4 is a diagram illustrating a second embodiment of a system for processing carnallite ore.

FIG. 4 shows a diagram of an alternative system 320 for processing carnallite ore. System 320 is similar in most respects to system 120 for processing sylvinite ore. System 320 includes a measuring hopper 322 and a first dissolving apparatus 324. Dissolving apparatus 324 is in the form of a column. The cross section of the column determines the flow rate of the ore to be processed. Dissolving apparatus 324 further includes a spillway 326 at the upper end, an outlet 328 at the lower end, and a port 332 along the intermediate extent. Alternating supply and grounding electrodes 334 are preferably positioned within the interior area of apparatus 324 and are in alignment with the direction of the flow of lye. One of the electrodes is a supply electrode the other is a grounding electrode. Supply electrodes are preferably connected through electronic keys to a source of power of alternating current with a variable frequency of 1-3 Hertz ("Hz") and a supply voltage of approximately 24-30 volts ("V"). The electrodes preferably have a spacing of 0.04 meters and a length of 1.5 meters. A volume of solvent lye is supplied to the interior area via port 332. The solvent lye is preferably supplied at a temperature of approximately 40-50° C. Carnallite ore is supplied to the upper end of apparatus 324 from measuring hopper 322. The solvent lye from source 330 mixes with the carnallite ore in a counter current flow within the interior area of apparatus 324. Dissolving of the ore in the apparatus 324 occurs conjointly with the suspension treatment by alternating electromagnetic field of low frequency that is applied on supply electrodes 334.

A first dehydrator 336 is associated with first dissolving apparatus 324. Dehydrator 336 includes a lower inlet 338 and an upper outlet 342. An internal screw conveyor 344 extends between the lower inlet 338 and the upper outlet 342. Internal conveyor 344 is driven by an upper geared motor. Undissolved carnallite ore exiting the outlet 328 of the first dissolving apparatus 324 enters the lower inlet 338 of first dehydrator 336. Internal screw conveyor 344 transports the undissolved carnallite ore to the upper outlet 342 of dehydrator 336.

System 320 also includes a second dissolving apparatus 346. Second dissolving apparatus 346 has an identical construction to the first dissolving apparatus 324. Second dissolving apparatus 346 has upper and lower ends, an intermediate extent therebetween, and an interior area. Apparatus 346 has a spillway 348 at the upper end, an outlet 352 is at the lower end, and a port 354 along the intermediate extent. Alternating supply and grounding electrodes 356 are preferably positioned within the interior area of apparatus 346. At any point in the treatment time, the application of the fields on supply electrodes is in the dissolving columns 324 and 346 occurs in phase opposition. Electrodes 356 have the same construction and operation as electrodes 334. A volume of solvent lye is supplied to the interior area of apparatus 346 via port 354. Carnallite ore is supplied to the upper end of the second dissolving apparatus 346 via the upper outlet 342 of the first dehydrator 336. Dissolving of the ore in the apparatus 324 occurs conjointly with the suspension treatment by alternating electromagnetic field of low frequency that is applied on supply electrodes. This produces a supersaturated solution of potassium chloride and magnesium chloride.

A second dehydrator 358 is associated with second dissolving apparatus 346. This second dehydrator 358 includes a lower inlet 362 and an upper outlet 364. An internal screw conveyor 366 extends between the lower inlet and the upper outlet. Screw conveyor 366 is powered by an upper geared motor. Undissolved carnallite ore exiting the outlet 352 of the second dissolving apparatus 346 enters the lower inlet 362 of the second dehydrator 358. Undissolved ore from the second dehydrator 358 can be disposed. Internal screw conveyor 366 transports the undissolved carnallite ore to the upper outlet 364.

System 320 also includes a crystallizer 368. Crystallizer 368 includes an upper inlet 372, a lower outlet 374, and an interior area 376. Interior area 376 has a heat exchanger. In the preferred embodiment, the heat exchanger is a shell in tube type heat exchanger wherein the lye solution is brought into thermodynamic contact with a refrigerant. Solution is received in the upper inlet 372 from the spillways (326 and 348) of the first and second dissolving apparatuses (324 and 346). In crystallizer 368, artificial carnallite crystallizes from the supersaturated solution in volume. Any non-crystallized solution (i.e. the remaining lye solution after the crystals have been taken out) is clarified and heated and re-circulated for use within dissolving apparatuses 324 and 346. A third dehydrator 378 is in communication with the lower outlet 374 of crystallizer 368. Third dehydrator 378 dries the crystallized carnallite formed in the crystallizer. The crystallized artificial carnallite can then be utilized for any of a number of intended purposes.

In use, carnallite ore containing over 13.9% of magnesium chloride, 28.9% of potassium chloride, 36.9% of sodium chloride, and 3.1% of insoluble residue is fed to the measuring hopper 322. Saturated lye is prepared in a clarifier. The crushed (or pulverized) ore is fed to the dissolving apparatus 324 with the dissolving lye in a liquid/solid ratio of 2:1. The lye is supplied from the bottom feed at a temperature of T=40-50° C. in countercurrent flow to the ore. The dissolution of the ore is performed in the dissolving apparatuses 324 and 346 with simultaneously exposure of the solutions to low-frequency electromagnetic fields from the power supply source with a voltage of 24-30 V. As a result, the potassium chloride and magnesium chloride are converted from ore to a solution. From the dissolving apparatus spillovers 326 and 348, the solution goes to the refrigerator 376. As a result of the cooling of the solution in refrigerator 376 to a temperature of T=25° C., an artificial carnallite is crystallized. Following crystallization, the artificial carnallite goes from refrigerator 376 to the wet product dehydrator 378 for drying.

In the proposed facility, the ore goes from apparatus 324 to dehydrator 336, and then, after dissolution and low-frequency electromagnetic field exposure of the suspension, the ore goes from dehydrator 336 to second dissolving apparatus 346. Ore from apparatus 346 travels to dehydrator 358. Ore from dehydrator 358 can be delivered to waste. The solution left over from crystallization in refrigerator 376 can go for clarification. After settling, the insoluble residue is removed from the process in the form of fine clay, which can be used in the chemical and construction industries or for economic purposes. The clarified lye is sent via a heater to the carnallite ore dissolution stage. Thus, the proposed facility makes it possible to produce high-quality artificial carnallite in a closed cycle with circulating lye.

Method for Producing Artificial Carnallite

Crushed carnallite ore underwent processing, where an average grain size was less than 5 mm, containing over 13.9% of magnesium chloride, 28.9% of potassium chloride, 36.9% of sodium chloride, and 3.1% of insoluble residue. The ore was processed in vertical dissolvers using circulating lye.

The crushed ore was fed into the first dissolver. The first dissolver preferably has a height of 1.5 m. The lye at a temperature of less than 50° C., and preferably at approximately 45° C., was supplied in the lower part of the dissolver in countercurrent flow to the ore. The ratio of lye to ore is approximately 2:1. The countercurrent flow ensures that the carnallite does not crystallize within the dissolver. Supply electrodes with a spacing of 0.04 m and height of 1.5 m were installed in axial alignment in the column and were connected to a source of an alternating electromagnetic field with a ramp period of no more than 1 second. The supply voltage was less than 30 V and preferably at approximately 26 V. At the same time that the ore and lye were supplied, the solution was treated by exposing it to electromagnetic fields with a ramp period of 1 second. As a result of the exposure, the potassium chloride and magnesium chloride are converted from ore to a solution.

The lye overflowed from the dissolver and was sent to a refrigerator. The refrigerator can be, for example, a shell-and-tube heat exchanger. In the refrigerator, the temperature of the lye drops to approximately 25° C. . Upon cooling of the lye in the refrigerator, the carnallite crystallized in the lye and precipitated. From the refrigerator, the lye went for clarification using the settling method. After settling, the insoluble residue was removed from the process in the form of a fine clay, which can be used in the chemical and construction industries or for economic purposes. The clarified lye can be sent to a heater so that it can be used in a dissolver.

Ore was removed from the lower part of the first dissolving column and was sent for dehydration. Following dehydration, the ore was supplied via the top feed to the second vertical dissolver that was the same in most respects to the first dissolver. The lye at a temperature of less than 50° C., and preferably at approximately 45° C., was supplied in the lower part of the column in countercurrent flow to the ore. The second stage of potassium chloride and magnesium chloride leaching was carried out in the second column while the solution was exposed to a low-frequency electromagnetic field and the lye overflowed from the top part of the dissolver. The lye went to the refrigerator, where the process of carnallite crystallization took place in the solution due to the cooling. The potassium chloride content in the original lye, ore, and circulating lye was determined by the perchlorate method. From the second dissolver, the ore went through a second dehydrator, and then went to produce food-grade and industrial salt, as well as to waste.

Chemical analysis of the samples showed that, as a result of the carnallite ore dissolution together with exposing the solution to low-frequency electromagnetic fields, the $MgCl_2$ content in the enriched carnallite is 33.61%, the $CaSO_4$ is 0.046%, and the $Fe_2O_3$ is 0.0215%. In accordance with the technical regulations, the weight percent of magnesium chloride is (31.5+/−1.0) %. The chemical composition and physicochemical properties of the enriched carnallite obtained through the developed method meet the characteristics of a high quality product.

The above described methods yield several important advantages. The energy cost even only at the dissolving stage can be reduced by 200 times in comparison with the halurgical method. The column type dissolving apparatuses are easy to manufacture and maintain in comparison with traditional screw type dissolvers. In the developed method there is no need for vacuum crystalizing plants; crystallization of potassium chloride and artificial carnallite occur in the standard shell-and-tube heat exchangers. Recovery of potassium chloride from the ore is more than 90%. The KCl content in the end product is more than 99%. The developed method excludes the usage of chemical reagents, among them synthetic surface active substances (SSAS), including amines. The application of simple and small sized equipment allows locating processing apparatuses directly in the mine and yields the final product directly in the mine.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for processing ore comprising:
a supply containing a volume of a lye solution;
a first dissolving apparatus having first and second inlets and first and second outlets, the first inlet receiving ore to be processed, the second inlet receiving lye solution from the supply, the first inlet being positioned above the second inlet, the lye and ore mixing in a counter current flow to produce a supersaturated solution and undissolved ore;
a first dehydrator having an inlet and an outlet, the inlet of the first dehydrator receiving the undissolved ore from the first outlet of the first dissolving apparatus;
a second dissolving apparatus having first and second inlets and first and second outlets, the first inlet receiving the undissolved ore from the outlet of the first dehydrator, the second inlet receiving lye solution from the supply, the first inlet being positioned above the second inlet, wherein the lye solution and undissolved ore are mixed in a counter current flow to produce a supersaturated solution and undissolved ore;
a second dehydrator having an inlet and an outlet, the inlet of the second dehydrator receiving undissolved ore from the first outlet of the second dissolving apparatus;
a crystallizer having an inlet and an outlet, the supersaturated solution from the second outlets of the first and second dissolving apparatuses being delivered to the inlet of the crystallizer, the crystallizer cooling and crystallizing the supersaturated solution.

2. The system as described in claim 1 further comprising a measuring hopper for delivering the ore to be processed to the first inlet of the first dissolving apparatus.

3. The system as described in claim 1 further comprising a third dehydrator, the third dehydrator receiving and dehydrating the crystallized solution from the outlet of the crystallizer.

4. The system as described in claim 1 wherein the ore to be processed is sylvinite ore.

5. The system as described in claim 4 wherein the first and second dissolving apparatuses produce a solution that is supersaturated with potassium chloride.

6. The system as described in claim 5 wherein the supersaturated potassium chloride is crystallized in the crystallizer.

7. The system as described in claim 1 wherein the ore to be processed is carnallite ore.

8. The system as described in claim 7 wherein the first and second dissolving apparatuses produce a solution that is supersaturated with potassium chloride and magnesium chloride.

9. The system as described in claim 8 wherein the supersaturated potassium chloride and magnesium chloride solution is crystallized in the crystallizer to produce artificial carnallite.

10. The system as described in claim 1 wherein the first and second dehydrators are screw type conveyors.

11. The system as described in claim 1 further comprising supply and grounding electrodes within the first and second dissolving apparatuses.

12. The system as described in claim 11 wherein the low-frequency electromagnetic fields apply on supply electrodes that assist with the dissolution of the ore.

13. The system as described in claim 12 wherein the application of electromagnetic fields on supply electrodes within the first dissolving apparatus occurs in phase opposition to the application of electromagnetic fields on supply electrodes of the second dissolving apparatus.

14. A system (20) for processing sylvinite ore to produce potassium chloride, the system (20) comprising:
a measuring hopper (22) having an inlet and an outlet, the inlet adapted to receive a volume of sylvinite ore to be processed;
a first dissolving apparatus (24) having upper and lower inlets and upper and lower outlets, the upper inlet receiving sylvinite ore from the outlet of the measuring hopper (22);

a first dehydrator (26) having an upper inlet and a lower outlet, the upper inlet of the first dehydrator (26) in communication with the lower outlet of the first dissolving apparatus (24);

a lye clarifier (28) and a lye heater (32) adapted to deliver a heated and clarified lye solution to the lower inlet of the first dissolving apparatus (24), wherein the lye solution and sylvinite ore are brought into counter current flow within the first dissolving apparatus (24), and wherein the lye solution leaches potassium chloride from the sylvinite ore to produce a supersaturated potassium chloride solution and undissolved sylvinite ore, the undissolved sylvinite ore passing to the inlet of the first dehydrator (26);

a second dissolving apparatus (34) having upper and lower inlets and upper and lower outlets, the upper inlet receiving the undissolved sylvinite ore from the lower outlet of the first dehydrator (26), the lower inlet receiving lye solution from the lye clarifier (28) and the lye heater (32), wherein the lye solution and undissolved sylvinite ore are brought into counter current flow within the second dissolving apparatus (34) to produce a supersaturated potassium chloride solution and undissolved sylvinite ore;

a second dehydrator (36) having an inlet and an outlet, the inlet of the second dehydrator (36) in communication with the lower outlet of the second dissolving apparatus (34), the second dehydrator (36) receiving the undissolved sylvinite ore from the second dissolving apparatus (34);

a crystallizer (38) having an inlet and an outlet, supersaturated potassium chloride from the upper outlets of the first and second dissolving apparatuses (24 and 34) being delivered to the inlet of the crystallizer, the crystallizer (38) cooling the supersaturated potassium chloride to form crystallized potassium chloride;

a third dehydrator (42) for dehydrating the crystallized potassium chloride.

15. The system (120) for processing sylvinite ore into potassium chloride, the system comprising:

a measuring hopper (122) for receiving a supply of pulverized sylvinite ore for processing;

a first dissolving apparatus (124) having upper and lower ends, an intermediate extent therebetween, and an interior area, a spillway (126) at the upper end, an outlet (128) at the lower end, and a port along (132) the intermediate extent, supply and grounding electrodes (134) positioned within the interior area, a volume of solvent lye being supplied to the interior area via the port, sylvinite ore supplied to the upper end from the measuring hopper, the solvent lye mixing with the sylvinite ore in a counter current flow within the interior and within an alternating electromagnetic field applied on supply electrodes, the mixing producing supersaturated potassium chloride and undissolved sylvinite ore;

a first dehydrator (136) including a lower inlet (138) and an upper outlet (142), an internal screw conveyor (144) extending between the lower inlet and the upper outlet, undissolved sylvinite ore exiting the outlet of the first dissolving apparatus and entering the lower inlet of the first dehydrator, the internal screw conveyor transporting the undissolved sylvinite ore to the upper outlet;

a second dissolving apparatus (146) having upper and lower ends, an intermediate extent therebetween, and an interior area, a spillway (148) at the upper end, an outlet at the lower end (152), and a port (154) along the intermediate extent, electrodes (156) positioned within the interior area, a volume of solvent lye being supplied to the interior area via the port, sylvinite ore supplied to the upper end of the second dissolving apparatus via the upper outlet of the first dehydrator, the solvent lye mixing with the sylvinite ore in a counter current flow within the interior and with conjointly suspension treatment by an alternating electromagnetic field of low frequency applied on supply electrodes, the mixing producing supersaturated potassium chloride;

a second dehydrator (158) including a lower inlet (162) and an upper outlet (164), an internal screw conveyor (166) extending between the lower inlet and the upper outlet, undissolved sylvinite ore exiting the outlet of the second dissolving apparatus and entering the lower inlet of the second dehydrator, the internal screw conveyor transporting the undissolved sylvinite ore to the upper outlet;

a crystallizer (168) including an upper inlet (172), a lower outlet (174), and an interior area (176) with a heat exchanger, supersaturated potassium chloride being received in the upper inlet from the spillways (126 and 148) of the first and second dissolving apparatuses (124 and 146), the supersaturated potassium chloride being crystallized via the heat exchanger;

a third dehydrator (178) in communication with the lower outlet (174) of the crystallizer (168), the third dehydrator (178) drying the crystallized potassium chloride formed in the crystallizer.

* * * * *